United States Patent
Lee et al.

(10) Patent No.: US 10,393,424 B2
(45) Date of Patent: Aug. 27, 2019

(54) REFRIGERATOR

(71) Applicant: LG ELECTRONICS INC., Seoul (KR)

(72) Inventors: Heejun Lee, Seoul (KR); Hyunbum Kim, Seoul (KR); Seongwon Gwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/071,800

(22) PCT Filed: Jan. 12, 2017

(86) PCT No.: PCT/KR2017/000426
§ 371 (c)(1),
(2) Date: Jul. 20, 2018

(87) PCT Pub. No.: WO2017/126846
PCT Pub. Date: Jul. 27, 2017

(65) Prior Publication Data
US 2019/0024967 A1    Jan. 24, 2019

(30) Foreign Application Priority Data
Jan. 21, 2016    (KR) .......................... 10-2016-0007682

(51) Int. Cl.
| | | |
|---|---|---|
| *F25D 23/02* | (2006.01) | |
| *F25D 23/06* | (2006.01) | |
| *E05C 5/00* | (2006.01) | |
| *E05C 7/04* | (2006.01) | |
| *F16H 19/04* | (2006.01) | |

(52) U.S. Cl.
CPC .............. *F25D 23/028* (2013.01); *E05C 5/00* (2013.01); *E05C 7/04* (2013.01); *F16H 19/04* (2013.01);
(Continued)

(58) Field of Classification Search
CPC .. F25D 23/028; F25D 2323/021; F25D 23/02; F25D 11/00; F25D 23/087;
(Continued)

(56) References Cited

U.S. PATENT DOCUMENTS

| | | | |
|---|---|---|---|
| 9,631,857 B2 * | 4/2017 | Yoon | .......................... E06B 7/18 |
| 9,874,391 B2 * | 1/2018 | Jung | .......................... E05C 5/00 |

(Continued)

FOREIGN PATENT DOCUMENTS

| | | |
|---|---|---|
| KR | 10-2006-0075396 | 7/2006 |
| KR | 10-2010-0035095 | 4/2010 |
| KR | 10-1522186 | 5/2015 |
| KR | 10-2015-0082065 | 7/2015 |
| KR | 10-2015-0084265 | 7/2015 |

*Primary Examiner* — Hiwot E Tefera
(74) *Attorney, Agent, or Firm* — Fish & Richardson P.C.

(57) ABSTRACT

The present invention provides a refrigerator comprising: a cabinet having a storage chamber; an inner case that forms the exterior of the storage chamber; a first door rotatably installed on the cabinet so as to expose/cover one side of the storage chamber; a second door having a pillar that rotates such that the same can contact the first door, the second door being rotatably installed on the cabinet so as to expose/cover the other side of the storage chamber; and a transfer member provided on the inner case so as to sense the rotation of the first door and to guide the rotation of the pillar.

20 Claims, 8 Drawing Sheets

(52) U.S. Cl.
CPC ...... *F25D 23/066* (2013.01); *F25D 2323/021* (2013.01)

(58) Field of Classification Search
CPC .... F25D 23/025; F25D 23/066; F25D 23/065; E05F 15/63; E05F 15/614; E05F 5/06; E05C 5/00; E05C 7/04; E05C 19/16; E05C 7/06; F16H 19/04; F16H 2019/046
USPC ....... 312/405, 324, 401, 405.1; 49/366, 367, 49/368, 478.1; 62/449, 441
See application file for complete search history.

(56) References Cited

U.S. PATENT DOCUMENTS

| | | | |
|---|---|---|---|
| 9,982,936 B2* | 5/2018 | Yoon | E06B 7/18 |
| 2011/0048060 A1* | 3/2011 | Kim | E05B 17/0029 |
| | | | 62/449 |
| 2013/0241385 A1* | 9/2013 | Lee | F25D 23/028 |
| | | | 312/404 |
| 2013/0241386 A1* | 9/2013 | Kim | A47B 71/00 |
| | | | 312/404 |
| 2016/0178268 A1* | 6/2016 | Jung | E05F 1/10 |
| | | | 312/404 |
| 2016/0313050 A1* | 10/2016 | Yoon | E06B 7/18 |
| 2017/0191735 A1* | 7/2017 | Jung | E05C 5/00 |
| 2017/0191738 A1* | 7/2017 | Jung | E05C 5/00 |
| 2018/0010845 A1* | 1/2018 | Kim | F25D 23/02 |
| 2018/0292127 A1* | 10/2018 | Park | H05B 37/0227 |

* cited by examiner

REFRIGERATOR

CROSS REFERENCE TO RELATED APPLICATIONS

This application is the National Phase of PCT International Application No. PCT/KR2017/000426, filed on Jan. 12, 2017, which claims priority under 35 U.S.C. 119(a) to Patent Application No. 10-2016-0007682, filed in the Republic of Korea on Jan. 21, 2016, which is hereby incorporated by reference herein in their entirety.

FIELD

The present disclosure relates to a refrigerator, more particularly, a refrigerator which may open one storage chamber by using two side-by-side doors so as to enhance use convenience.

BACKGROUND

Generally, a refrigerator is an electric appliance configured to store foods in a fresh state for a preset time period by chilling the foods stored in a storage chamber (a freezer compartment and a refrigerator compartment), while repeating a freezing cycle.

A compressor is provided in the refrigerator to compress the refrigerant circulating the freezing cycle into a high-temperature-and-high-pressure refrigerant. The refrigerant compressed in the compressor may generate cold air while passing through a heat exchanger and the generated cold air may be supplied to the freezer or refrigerator compartment.

Such the refrigerator usually includes the freezer compartment mounted on a top and the refrigerator compartment mounted on a bottom. A side by side type has the refrigerator compartment and the freezer compartment mounted side by side.

As a further type, a two-door type refrigerator has two doors which are provided to open and close one storage chamber provided in an upper or lower portion.

In case such two doors are provided to open and close one storage chamber, a pillar is installed in one of them. The pillar is provided one of the two doors and able to contact with the two doors once the two doors closes the storage chamber, only to enhance a degree of the tight closing of the storage chamber.

In the prior art to which the present invention pertains, the conventional refrigerator further include a projection and a guide groove which are provided in an inner case and configured to guide the rotation of the pillar.

In the conventional refrigerator, the structure for guiding the rotation of the pillar has to be projected downwardly from a top of the inner case such that the user could feel uncomfortable in using the storage chamber.

Moreover, in a state where the door having the pillar has closed the storage chamber, the pillar is unfolded out of the corresponding door so as to interfere a passage of a drawer installed in the refrigerator. Accordingly, the widths of the drawers disadvantageously have to be changed in a state where two drawers are arranged side by side.

Also, in a state where the pillar is unfolded, a basket provided in the door has to have gently curved corners not to contact with the pillar when rotating together with the door. Accordingly, the storage capacity of the basket cannot help decreasing disadvantageously.

DETAILED DESCRIPTION OF THE INVENTION

Technical Problem

To overcome the disadvantages, an object of the present disclosure is to provide a refrigerator which may open one storage chamber by using two side-by-side doors so as to enhance use convenience.

Technical Solution

To achieve these objects and other advantages and in accordance with the purpose of the embodiments, as embodied and broadly described herein, a refrigerator comprises a cabinet comprising a storage chamber; an inner case which defines the exterior of the storage chamber; a first door rotatably coupled to the cabinet and configured to open and close one side of the storage chamber; a second door comprising a pillar rotatable to contact with the first door, the second door rotatably coupled to the cabinet and configured to open and close the other side of the storage chamber; and a transmission member provided in the inner case and configured to guide the rotation of the pillar by detecting the rotation of the first door, wherein a pillar magnetic portion is provided in an upper area of the pillar, and a transmission member magnetic portion configured to generate a magnetic force interference in the pillar magnetic portion is provided in the transmission member, and a first door magnetic portion configured to operate the transmission member is provided in an upper area of the first door.

The transmission member may guide the pillar to be folded when the first door is open and the transmission member may guide the pillar to be unfolded when the second door is closed.

The transmission member may comprise a driving unit in which the transmission member magnetic portion is installed, and the driving unit may guide the rotation of the pillar, while being moved left and right along the rotation of the first door.

The transmission member further comprise a guide unit guided forwardly and backwardly along the rotation of the first door; and a converting unit configured to convert the forward and backward movement of the guide unit into the left and right movement of the driving unit.

The driving unit and the guide unit may comprise rack gears, respectively, and the converting unit may comprise a pinion gear, and the rack gears and the pinion gear may engage with each other.

The driving unit may be moved right when the guide unit is moved backwardly, and the driving unit may be moved left when the guide unit is moved forwardly.

The guide unit may comprise a first holder and a second holder which are downwardly rotated moved, and a coupling groove may be formed in an upper area of the first door and configured to couple the first holder and the second holder thereto.

A shaft may be provided in a rear area of the first holder and a front area of the first holder may be rotated to be moved downwardly.

A tensile spring may be provided in the first holder and configured to guide the front area of the first holder upwardly unless an external force is applied to the first holder.

A shaft is provided in a front area of the second holder and a rear area of the second holder is rotated to be moved downwardly.

A tensile spring may be provided in the second holder and configured to guide the rear area of the second holder upwardly unless an external force is applied to the second holder.

A third holder may be provided in the driving unit and a shaft may be provided in a left area of the third holder and a right area of the third holder is rotated to be moved downwardly.

A tensile spring may be provided in the third holder and configured to guide a right area of the third holder upwardly unless an external force is applied to the third holder.

A pillar projection may be projected in an upper area of the pillar, and when the third holder is moved downwardly, the pillar projection may be caught by the third projection to guide the rotation of the pillar.

The transmission member magnetic portion may comprise a first transmission member magnetic portion arranged in a left area of the pillar magnetic portion; and a second transmission member magnetic portion arranged in a right area of the pillar magnetic portion.

The first transmission member magnetic portion and the pillar magnetic portion may be arranged to generate a repulsive force between them.

The second transmission member magnetic portion and the pillar magnetic portion may be arranged to generate a repulsive force between them.

The guide unit may comprise a guide unit magnetic portion, and the guide unit magnetic portion is arranged to generate a repulsive force with the first door magnetic portion.

The guide unit may comprise an elastic member, and when the first door magnetic portion approaches, the elastic member may be compressed and the guide unit is moved backwardly.

The refrigerator may further comprise a first drawer arranged in the first door; and a second drawer arranged in the second door, wherein the first drawer and the second drawer have the same width.

The first drawer and the second drawer may be arranged on the same flat surface, and the first drawer and the second drawer may be retractable independently.

The first door and the second door may have the same width.

Advantageous Effects

The embodiments have following advantageous effects. In a state where only the door having the pillar is closed while the other door opens the storage chamber, the pillar is folded. Accordingly, when pulling out the drawer installed in the other door, the drawer will not be caught by the pillar and the widths of the drawers installed in the two doors may be the same.

In a state where only the door having the pillar is closed while the other door opens the storage chamber, the pillar is folded. When the user rotates the other door, the basket will not be caught by the pillar. Accordingly, the corners of the basket may be formed angular and the storage capacity of the basket may be enlarged.

The rotation of the pillar is determined based on the location of the door having no pillar. Accordingly, the reliability of the pillar folding or unfolding may be enhanced.

DESCRIPTION OF SPECIFIC EMBODIMENTS

Referring to the accompanying drawings, exemplary embodiments of the present disclosure will be described in detail.

Regardless of numeral references, the same or equivalent components may be provided with the same reference numbers and description thereof will not be repeated. For the sake of brief description with reference to the drawings, the sizes and profiles of the elements illustrated in the accompanying drawings may be exaggerated or reduced and it should be understood that the embodiments presented herein are not limited by the accompanying drawings.

Figure 1:
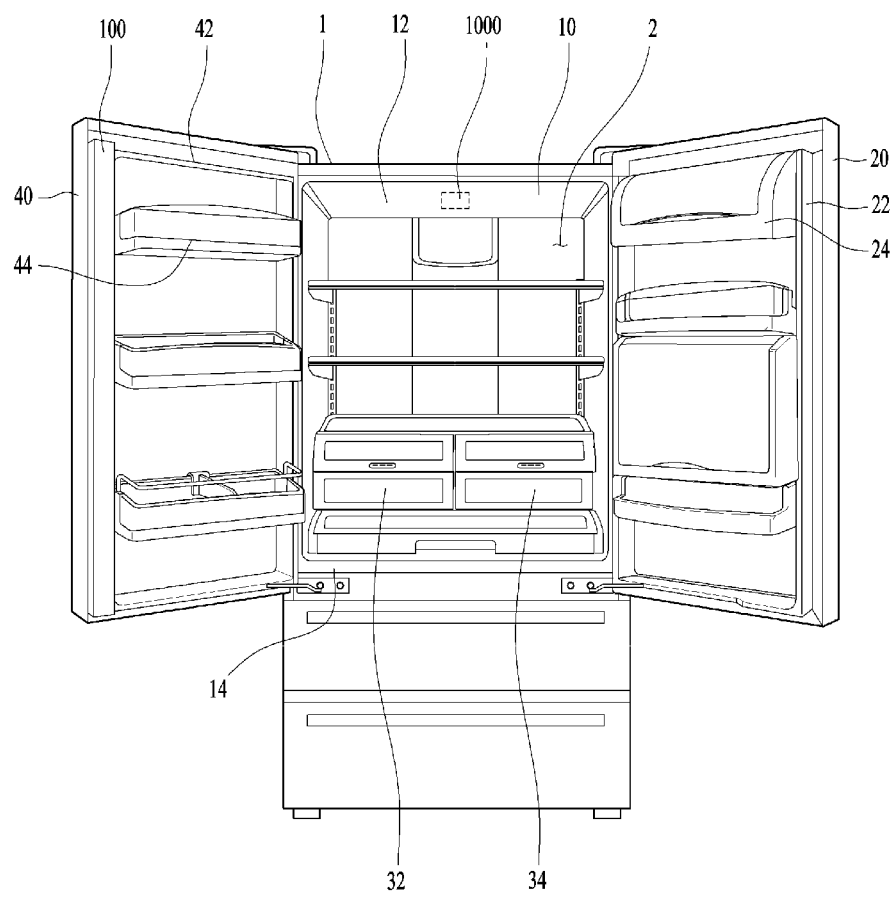
FIG. 1 is a front view of a refrigerator in accordance with one embodiment of the present disclosure.

FIG. 1 is a front view of a refrigerator in accordance with one embodiment of the present disclosure.

Referring to FIG. 1, the refrigerator in accordance with the embodiment includes a cabinet 1 which defines the exterior of the refrigerator.

A storage chamber 2 is provided in the cabinet 1 to store foods.

The storage chamber 2 may be defined by an inner case 10 provided in the cabinet. The inner case 10 may include an upper wall 12 and a lower wall 14 to finish inner surfaces of the storage chamber 2. A front surface of the storage chamber 2 may be open to allow access to the storage chamber to the user. The upper wall 12 means the ceiling 12 of the storage chamber 2 or inner case 10.

A first door 20 for opening one side of the storage chamber 2 and a second door 40 for opening the other side of the storage chamber 2 are rotatably coupled to the front surface of the cabinet 1. In this instance, when the first door 20 and the second door 40 close the front surface of the storage chamber 2, the storage chamber 2 may be entirely closed tight.

The second door 40 may include a pillar 100 rotatable to contact with the first door 20. The pillar 100 may be formed in a rectangular parallelepiped shape and rotatably coupled to the second door so as to rotate with respect to the second door 40. In this instance, the pillar 100 may be rotatable with respect to the second door 40 at a different angle according to a rotation angle of the second door 40 with respect to the storage chamber 40 or whether the first door 20 opens the storage chamber 2. In other words, the pillar 100 may be folded or unfolded based on whether the first door 20 opens the storage chamber 2 or not.

The pillar 100 has a shorter length than a gap between the upper wall 12 and the lower wall 14 not to contact with the walls of the inner case 10. In other words, even when the rotating second door 20 closes the storage chamber 2, the pillar 100 will not contact with both of the upper and lower walls 12 and 14.

The first door 20 may include a door dike 22 which defines a rear exterior of the first door 12. The second door 40 may also include a door dike 42 which defines a rear exterior of the second door 40.

Baskets 44 and 24 may be installed in the door dikes 42 and 22, respectively, and it is possible to store diverse kinds of foods in the baskets 44 and 24. At this time, the basket 44 provided in the first door 20 having no pillar 100 will not be interfered with such that corners of those basket 24 can be formed angular. Accordingly, more foods may be stored in the basket 24 than the basket having curved corners.

The storage chamber 2 may include a first drawer 34 arranged toward the first door 20; and a second drawer 32 arranged toward the second door 40. In this instance, the first drawer 34 and the second drawer 32 may be arranged on the same horizontal plane. In other words, the first drawer 34 and the second drawer 32 may be arranged in the storage chamber 2 at the same height side by side. The first drawer 34 and the second drawer 32 may be extractable independently.

The first drawer 34 and the second drawer 32 may have the same width. In other words, they may have the same storage capacity and be used in substitution for each other. If they are formed in different shapes with the different widths, respectively, the first drawer 34 and the second drawer 32 have to be manufactured differently and the manufacturing costs could rise. In contrast, if the two drawers are formed in the same shape, the manufacturing costs fall advantageously.

In the embodiment of the present disclosure, when the user pulls out the first drawer 34 after opening the first door 20, the pillar 100 may not be arranged on the passage of pulling out the first drawer 34 and the function mentioned above can be realized. The reason why the pillar 100 is not arranged on the passage of the first drawer 34 will be described later in detail, referring to other drawings.

Meanwhile, in the embodiment of the present disclosure, the first door 20 and the second door 40 are formed at the same width. Accordingly, the manufacturing process and the manufacturing process of the second door 40 are partially shared, so as to lower the cost of the door production. The reasons will be described, referring to other drawings.

A transmission member 1000 may be provided in an inner surface of the upper wall 12 of the inner case 10 to rotate the pillar 100 by sensing the location of the first door 20.

The transmission member 1000 is embedded in the inner surface of the inner case 10 such that the user cannot recognize the transmission member 1000 easily. In addition, the transmission member 1000 embedded in the upper wall 12 may not interfere with the user's locus when put or take out the foods in or from the storage chamber 2.

Figure 2:
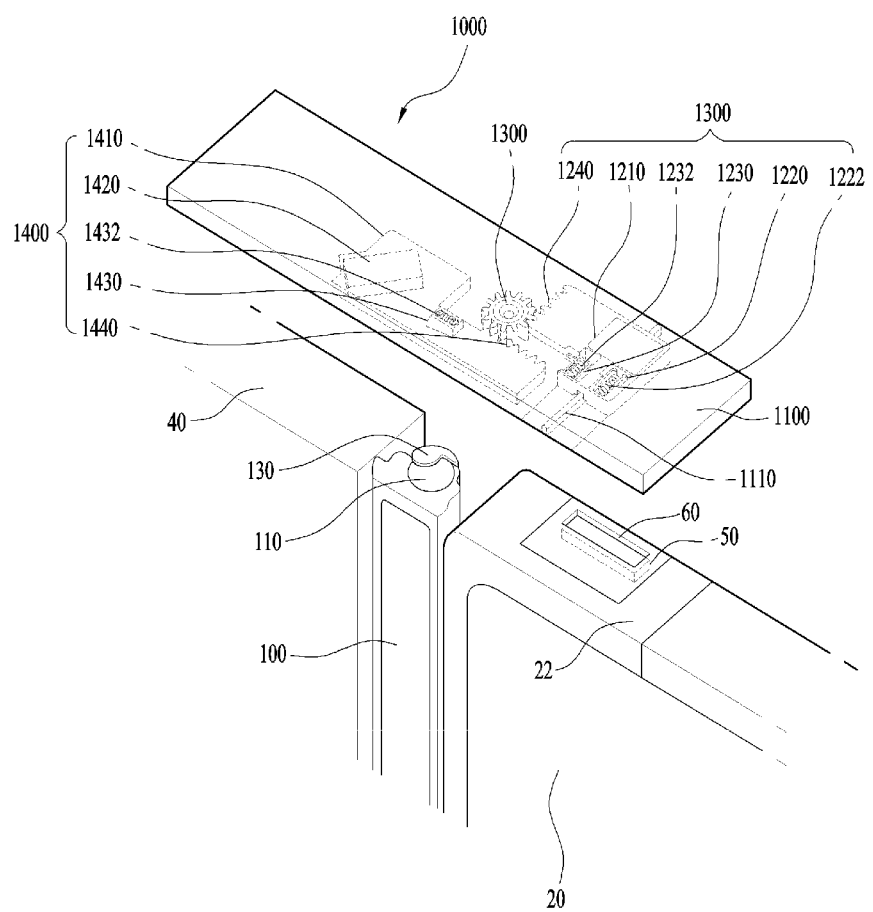
FIG. 2 is a diagram illustrating key parts of a refrigerator in accordance with a first embodiment.

FIG. 2 is a diagram illustrating key parts of the refrigerator in accordance with the first embodiment.

Referring to FIG. 2, the transmission member 1000 of this embodiment includes a guide unit 1200 configured to sense the rotation of the first door 20. The guide unit 1200 may recognize the location of the first door 20 and guide the pillar 100 to be rotated to a desired position by the transmission member 1000.

A pillar magnetic portion 110 may be provided in an upper area of the pillar 100. The transmission member 100 may include a transmission member magnetic portion configured to generate a magnetic force interference in the pillar magnetic portion 110 and the first door 20 may include a first door magnetic portion 50 provided in an upper area of the first door 20 and configured to operate the transmission member 1000.

All of the magnetic portions may mean magnets with a magnetic force.

The first door magnetic portion 50 is provided in the door dike 22 of the first door 20. The door dike 22 is the area that is the closest area to the upper wall 12 of the inner case 10. Even in case of having the same magnetic force, the first door magnetic portion 50 is arranged close to the transmission member 1000 and then able to generate the relatively strongest magnetic interference in the transmission member 1000.

A coupling groove 60 is formed in an upper area of the first door magnetic portion 50. The coupling groove 60 may define an empty space which is formed in a rectangular parallelepiped shape.

A pillar projection 130 is provided in an upper area of the pillar magnetic portion 110. The pillar projection 130 is projected from the pillar 100 upwardly. In a state where the pillar 100 is unfolded, the pillar projection 130 is arranged only in a rear area of the pillar 100. In other words, the pillar projection 130 may be partially projected from the pillar magnetic portion 110, not formed in the entire upper area of the pillar magnetic portion 110.

The transmission member 1000 includes a guide unit 1200 configured to sense the location of the first door 20; a driving unit 1400 driven to fold or unfold the pillar 100; and a converting unit 1300 configured to transmit the movement generated in the guide unit 1200 to the driving unit 1400.

The guide unit 1200 may detect the location of the first door 20 according to the location of the first door 20 and move to a corresponding position to the detected location of the first door 20. In other words, the guide unit 1200 is guided in a front-and-back direction of the guide unit 120 along the rotation of the first door 20.

The converting unit 1300 may convert the forward and backward movement of the guide unit 1200 into the horizontal direction movement of the converting unit 1300. The converting unit 1300 may include a pinion gear.

The driving unit 1400 may include a transmission member magnetic portion 1420 to guide the rotation of the pillar 100 by using the magnetic interference between the transmission member magnetic portion 1420 and the pillar magnetic portion 110. While getting moved in the horizontal direction, the driving unit 1400 may unfold or fold the pillar 100. The driving unit 1400 may include a housing 1410 having the transmission member magnetic portion 1420.

The guide unit 1200 includes a housing 1210 which defines the exterior appearance. When the guide unit 1200 needs moving, the housing 1210 is moved together with the guide unit 1200.

The housing 1210 may be coupled to a bar 1110 provided in the transmission member 1000 such that the bar 1110 can guide the forward and backward movement of the housing 1110. In other words, the bar 1110 is provided to penetrate the center of the housing 1210 and the housing 1210 is moved forwardly and backwardly along the shape of the bar 1110. A through-hole may be provided in the housing 1210 to facilitate the penetration of the bar 1110.

The guide unit 1200 includes a first holder 1220 and a second holder 1230 which are rotatably moved downwardly. The first holder 1220 and the second holder 1230 may have shafts, respectively, such that they may be downwardly rotated on the shafts.

Metal materials are inserted in the first holder 1220 and the second holder 1230, respectively, to be affected by the magnetic force of the first door magnetic portion 50. Accordingly, when the first door magnetic portion 50 approaches the first holder 1220 and the second holder 1230, the metal materials are under the magnetic force of the first door magnetic portion 50 and then rotated downwardly.

Tensile springs 1222 and 1232 may be provided in the first holder 1220 and the second holder 1230, respectively. When the first door magnetic portion 50 approaches the first holder 1220 and 1230, the tensile springs 1222 and 1232 are tensioned by the magnetic force of the first door magnetic portion 50. In contrast, when the first door magnetic portion 50 becomes far from the first holder 1220 and the second holder 1230, the magnetic force of the first door magnetic portion 50 becomes weak and the springs 1222 and 1232 are restored to the original size. Accordingly, the first holder 1220 and the second holder 1230 may be downwardly rotated by the magnetic force of the first door magnetic portion 50 or upwardly rotated by the restoring force of the springs 1222 and 1232.

The guide unit 1200 includes a rack gear 1240 configured to engage with the pinion gear of the converting unit 1300. When the guide unit 1200 is moved backwardly, the transmission unit 1300 is rotated in a counter-clockwise direction. When the guide unit 1200 is rotated forwardly, the transmission unit 1300 is rotated in a clock-wise direction.

The driving unit 1400 includes a rack gear 1440 configured to engage with the pinion gear of the converting unit 1300. When the converting unit 1300 is rotated in the clockwise direction, the driving unit 1400 is moved left. When the converting unit 1300 is rotated in the counter-clockwise direction, the driving unit 1400 is moved right.

The transmission member magnetic portion 1420 provided in the driving unit 1400 is arranged to have a repulsive force which becomes stronger as getting closer to the pillar magnetic portion 110. When the transmission member magnetic force 1420 and the pillar magnetic portion 110 face each other, the repulsive force is generated.

A third holder 1430 is provided in the driving unit 1400. The third holder 1430 has a metal material inserted therein, like the first holder 1220 and the second holder 1230. When the pillar magnetic portion 110 approaches, the third holder 1430 is rotated downwardly. A tensile spring 1432 is provided even in the third holder 1430. When the external force applied to the third holder 1430 is removed, the third holder 1430 may be moved upwardly by the tensile spring 1432.

The transmission member magnetic portion 1420 and the third holder 1430 are mounted in the housing 1410. When the driving unit 1400 is moved, the transmission member magnetic portion 1420 and the third holder 1430 are moved together. The driving unit 1400, in other words, the third holder 1430 and the transmission member magnetic portion 1420 are moved horizontally together so as to guide the rotation of the pillar 100.

The transmission member 1000 is embedded in the inner case 10 such that the user cannot recognize the presence of the transmission member 1000 easily. Especially, as the first holder 1230, the second holder 1240 and the third holder 1430 are rotated downwardly, only when the corresponding magnetic portions approaches them, and then they are not exposed to the user. At the moment when the corresponding magnetic portions approach the holders, respectively, the user cannot see the transmission member 1000 entirely and the transmission member 1000 is hidden by the door. When the magnetic portions become farther from the corresponding holders, the holders are guided to the original positions, in other words, the upper area of the transmission member 1000. Accordingly, the user cannot recognize the original holders easily and then the user can have easy access to the storage chamber 2, without interference of the holders when using the storage chamber 2.

Figure 3:
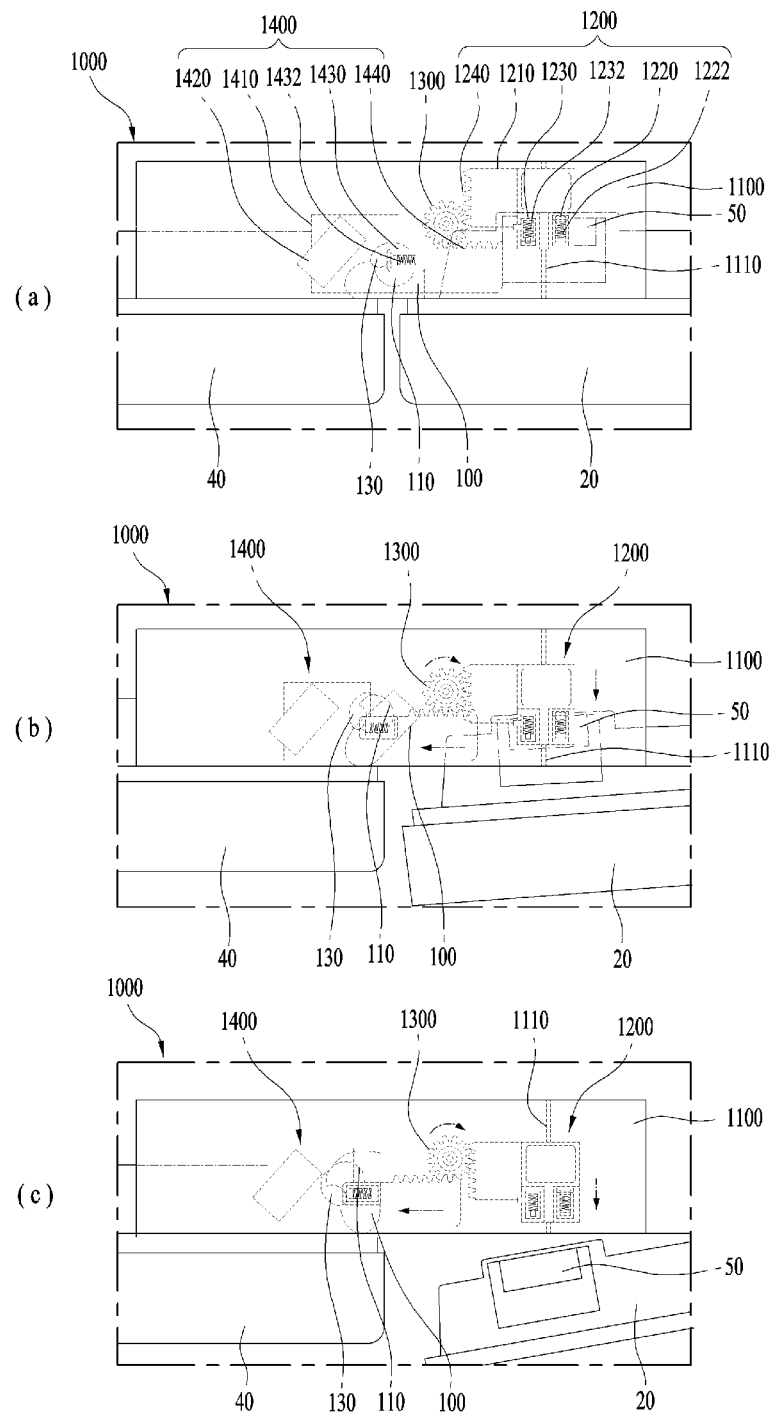
FIG. 3 is a diagram illustrating the operation when a first door is rotated in the refrigerator.
Figure 4:
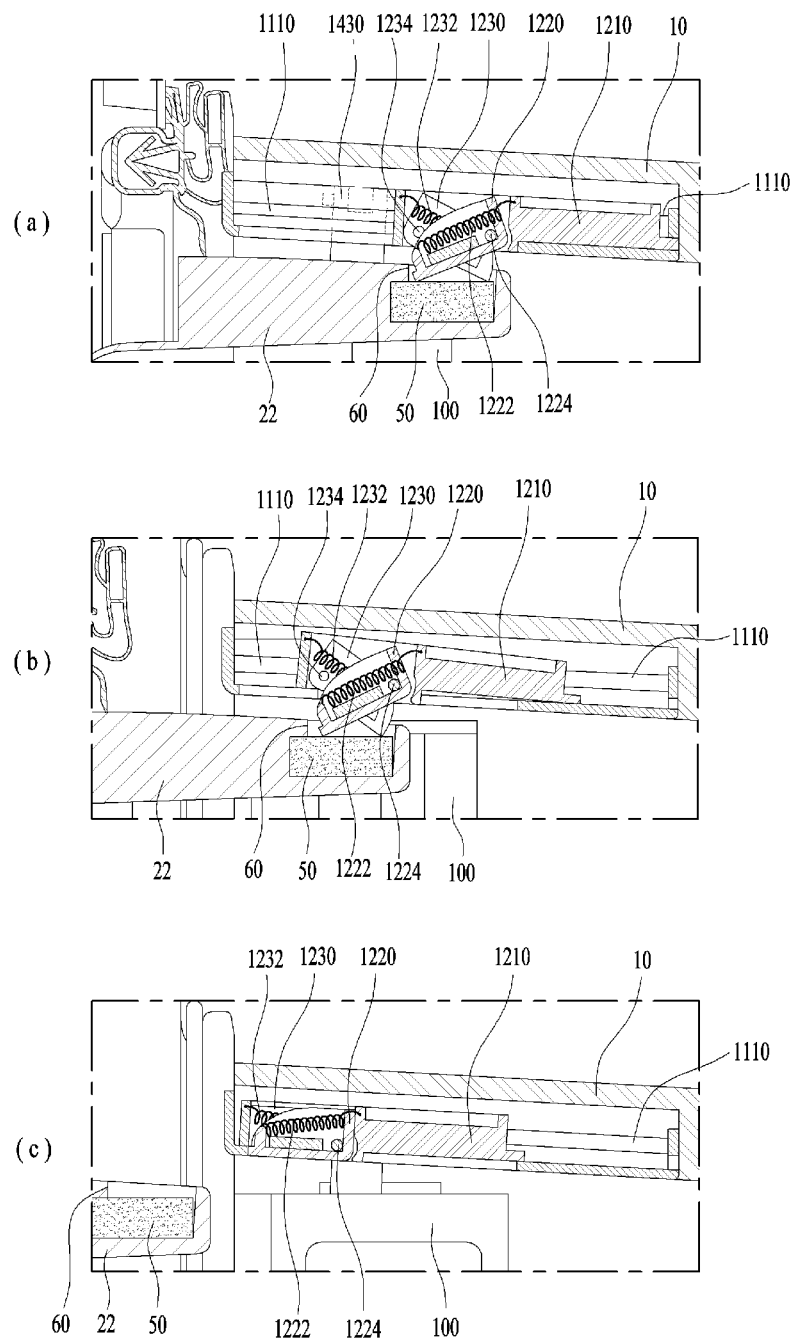
FIG. 4 is a side view of FIG. 3.
Figure 5:
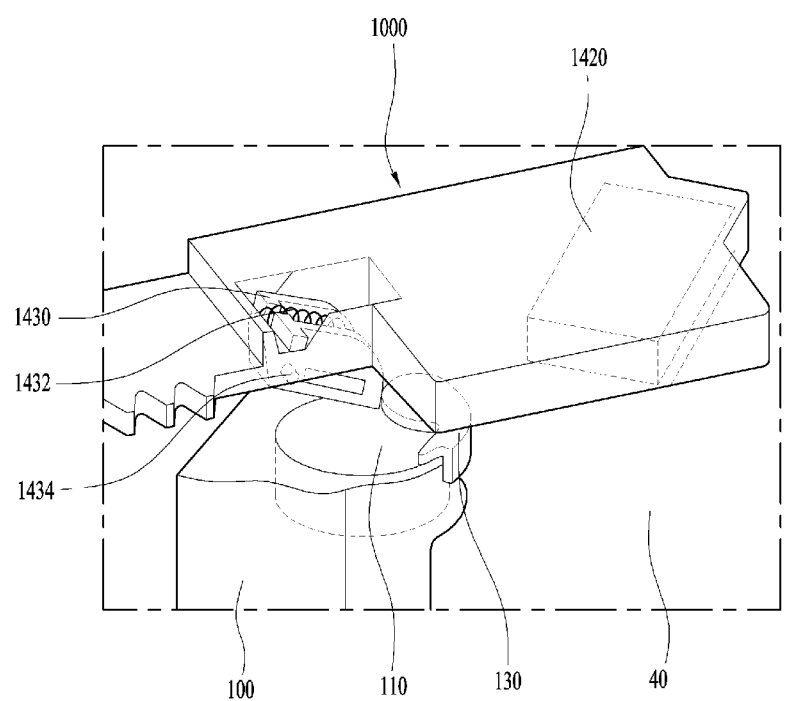
FIG. 5 is a diagram to describe a pillar shown in FIG. 3.

FIG. 3 is a diagram illustrating the operation when a first door is rotated in the refrigerator. FIG. 4 is a side view of FIG. 3. FIG. 5 is a diagram to describe a pillar shown in FIG. 3.

FIGS. 3a, 3b and 3c illustrate the operation relation for opening the first door, in a state where the user closes the second door. FIGS. 4a, 4b and 4c are diagrams of FIGS. 3a, 3b and 3c, viewed from a lateral surface. FIG. 5 is a diagram illustrating the operations of the pillar and the driving unit as shown in FIGS. 3b and 4b in detail.

Referring to FIGS. 3a and 4a, the pillar 100 is unfolded in a state where the first door 20 and the second door 40 close the storage chamber 2, closing the storage chamber 2 together with the first door 20 and the second door 40.

As the first door 20 is arranged adjacent to the guide unit 1200, the first holder 1220 and the second holder 1230 are moved downwardly. The first holder 1220 has the shaft 1224 which is provided in a rear area with respect to the view of FIG. 3a such that only a front area of the first holder 1220 may be moved downwardly. The second holder 1230 has the shaft 1234 which is provided in a front area with respect to the view of FIG. 3a such that only a rear area of the second holder 1230 may be moved downwardly.

The front area of the first holder 1220 and the rear area of the second holder 1230 are coupled to the coupling groove 60.

Bottoms of the first holder 1220 and the second holder 1230 are flat and upper surfaces of the holders are curved in an arc-shape. When the first holder 1220 and the second holder 1230 are rotated upwardly, only the bottoms are exposed outside such that the user can recognize the presence of the first holder 1220 and the second holder 1230 easily.

Meanwhile, the pillar magnetic portion 110 is located adjacent to a lower area of the third holder 1430 such that even the third holder 1430 may be in a state of being rotated downwardly.

Referring to FIGS. 3b and 4b, the user may rotate the first door 20 and open the storage chamber 2 in a state where the second door 40 is located to close the storage chamber 2 tight.

When the first door 20 is rotated forwardly with respect to the view of FIG. 3b, the second holder 1230 is coupled to the coupling groove 60 such that the guide unit 1200 may be moved forwardly along the rotation of the first door 20. At this time, the first holder is inserted in the coupling groove 60 but freely movable in the counter-clockwise direction with respect to the view of FIG. 4b, such that it cannot transmit the movement of the first door 20 to the guide unit 1200.

Once the guide unit 1200 is moved forwardly, the converting unit 1300 is rotated in the clockwise direction and the driving unit 1400 engaging with the converting unit 1300 is moved left.

As shown in FIG. 5, the right area of the third holder 1430 is moved downwardly and the right area of the third holder 1430 is caught by the pillar projection 130. Accordingly, the third holder 1430 is rotated right with respect to the view of FIG. 5 and the pillar projection is then moved, such that the pillar 100 can be rotated.

The third holder 1430 is rotated in the clockwise direction by the magnetic force of the pillar magnetic portion 110 with respect to the view of FIG. 5 and then rotated downwardly. In the state where the third holder 1430 is caught by the pillar projection 130, the height of the pillar projection is fixed such that the third holder 1430 cannot be rotated downwardly any further. Accordingly, the third holder 1430 is moved along the movement of the driving unit 1400 and the pillar projection caught by the third holder 1430 is also rotated together with the third holder 1430.

The pillar projection 130 is provided only in a predetermined area of the upper area of the pillar 100 and it may guide only the folding operation of the pillar 100, not the unfolding operation.

As shown in FIGS. 3c and 4c, when the user sufficiently rotates the first door 20, with leaving the second door 40 as it is, the guide unit 1200 cannot be moved forwardly any farther. As it is installed in the inner case 10 as the component of the transmission member 1000, the guide unit 1200 may not be forwardly moved out of the inner case.

Accordingly, the first door magnetic portion 50 cannot generate the interference of the magnetic force with the second holder 1230. The tensile spring 1222 of the first holder 1220 and the tensile spring 1230 of the second holder 1230 may be compressed to the original sizes, to restore the first holder 1220 and the second holder 1230 to the upwardly moved positions.

Meanwhile, the third holder 1430 is out of the magnetic force range of the pillar magnetic portion 110 such that the tensile spring 1432 can rotate the third holder 1430 upwardly, while it is compressed to the original size. Accordingly, the first holder, 1220, the second holder 1230 and the third holder 1430 may be accommodated by the transmission member 1000 not to be exposed to the user.

As shown in FIGS. 3c and 4c, the pillar 100 is folded toward the second door 40, in a state the user opens only the first door 20. When approaching the storage chamber 2 only by using the open area of the first door 20, the user may not be disturbed. Once it is folded, the pillar 100 is extended only to one end of the second door 40. Hence, the user's accessible range can increase as wide as the pillar 100 is folded, when pulling out the drawer provided in the first door 20. In addition, the pillar 100 is not arranged on the locus of the basket provided in the first door 20, when the first door 20 is rotated. Accordingly, the inner volume of the basket provided in the first door 20 becomes larger enough to store more foods in the basket of the first door 20.

The closing of the first door 20 after opening is realized in the reversed order of what is described above, in a state where the user closes the second door. In other words, the operation is performed in the order shown in FIGS. 3c, 3b and 3a and the order shown in FIGS. 4c, 4b and 4a.

Once using the storage chamber 2 after opening only the first door 20 sufficiently, the user is able to close the first door 20. Unless one end of the first door 20 becomes close to the inner case 10, the magnetic force of the first door magnetic portion 50 may not affect the guide unit 1200 and the guide unit 1200 stops as shown in FIG. 3c.

When the user rotates the first door 20 more to close the storage chamber 2 as shown in FIG. 3c, the magnetic force of the first door magnetic portion 50 affect the first holder 1220 and the second holder 1230 as shown in FIGS. 3b and 4b. Then, the first holder 1220 and the second holder 1230 may be downwardly rotated on the shafts 1224 and 1232, respectively. At this time, the tensile springs 1222 and 1232 are tensioned.

Ends of the first and second holders 1220 and 1230 are coupled to the coupling groove 60. When the user moves the first door 20 right with respect to the view of FIG. 4b, the guide unit 1200 is also moved right by the first holder 1220 coupled to the coupling groove 60.

At this time, the second holder 1230 is freely rotatable in the counter-clockwise direction with respect to the view of FIG. 4b, only not to guide the movement of the guide unit 1200 along the movement of the coupling groove 60. As the height of the coupling groove 60 is not variable, the first holder 1220 will not be rotated in the counter-clockwise direction any further. Accordingly, the first holder 1220 is coupled to the coupling groove 60 not to transmit the movement of the first door 20 to the guide unit 1200.

As shown in FIG. 3b, the guide unit 1200 is moved backwardly and the converting unit 1300 is then rotated in the counter-clockwise direction such that the driving unit 1400 is moved right.

The transmission member magnetic portion 1420 is configured to generate the repulsive force with the pillar magnetic portion 110. As the transmission member magnetic portion 1420 is moved right, the repulsive force between the transmission member magnetic portion 1420 and the pillar magnetic portion 110 becomes large. Accordingly, the pillar magnetic portion 110 is rotated to be far from the transmission member magnetic portion 1420 as the repulsive force becomes large, only to be converted into the unfolded state shown in FIG. 3a.

As shown in FIGS. 3b and 4b, the third holder 1430 gets closer to the pillar magnetic portion 110 and then rotated on the shaft 1434 downwardly. However, as the shaft of the third holder 1430 is arranged right with respect to the view of FIG. 3, the third holder 100 may not affect the pillar 1100 when the pillar 100 is rotated in a direction in which the pillar 100 is unfolded, in other words, the counter-clockwise direction.

As shown in FIGS. 3a and 4a, the first door 20 closes the storage chamber 2 tight and the third holder 1430 is then rotated downwardly to be located to the right of the pillar projection 130. After that, when the user rotates and opens the first door 20 in a state of closing the second door 40, the first door 20 is caught by the pillar projection 130 and the pillar 100 is rotated.

The shaft 1224 of the first holder 1220 is arranged in the rear area with respect to the view of FIG. 3. The shaft of the second holder 1230 is provided in the front area and the shaft of the third holder 1430 is provided in the left area.

Figure 6:
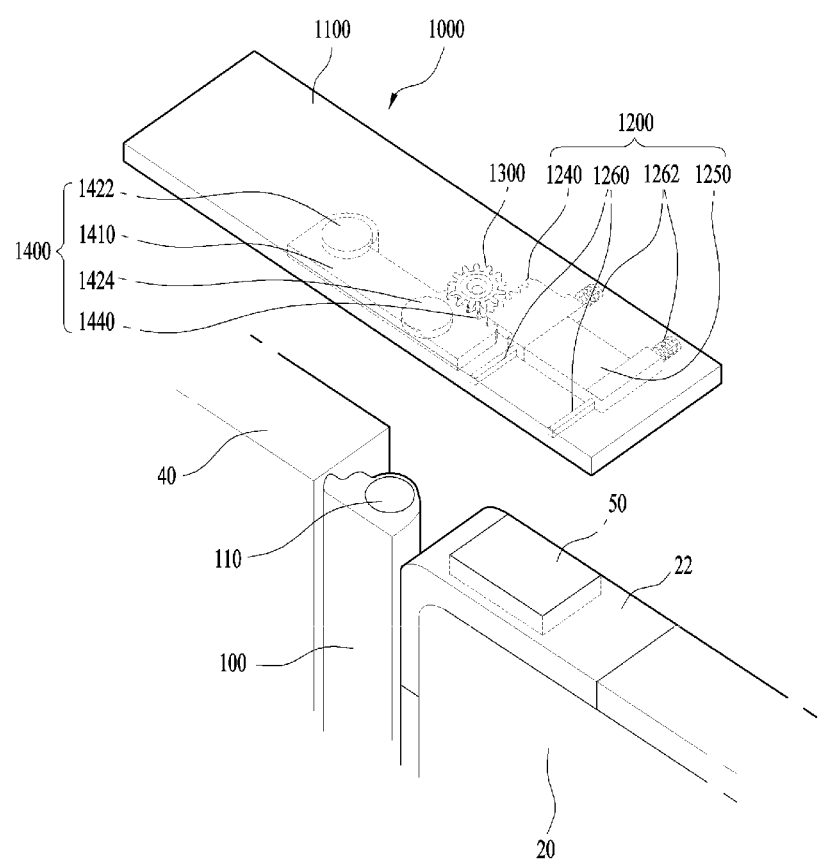
FIG. 6 is a diagram illustrating key parts of a refrigerator in accordance with a second embodiment.

FIG. 6 is a diagram illustrating key parts of a refrigerator in accordance with a second embodiment.

Referring to FIG. 6, the refrigerator in accordance with this embodiment may include a guide unit 1200, a converting unit 1300 and a driving unit 1400, similar to the first embodiment mentioned above. The guide unit 1200 may detect the rotation location of the first door 20. The converting unit 1300 may convert the moving direction of the guide unit 1200 and transmit the converted movement to the driving unit 1400. The driving unit 1400 may guide the rotation of the pillar 100.

This embodiment is entirely similar to the first embodiment and different technical features will be described in detail for easy description.

This embodiment is characterized in that the plurality of the holders are omitted and additional magnetic portions are provided, different from the first embodiment. In addition, the embodiment is characterized in that no coupling groove and no pillar projection are formed in the first door.

The guide unit 1200 may include a guide unit magnetic portion 1250; and a link 1260 configured to guide the forward and backward movement of the guide unit magnetic portion 1250. An elastic member 1262 is provided in a rear area of the link 1260 and configured to elastically support the forward movement of the guide unit magnetic portion 1250, when no external force is applied. The elastic member 1262 includes a compression spring. When the elastic member 1262 is compressed, the guide unit magnetic portion 1250 is moved backwardly. When the elastic member 1262 is restored to the original size, the guide unit magnetic portion is moved forwardly.

The guide unit magnetic portion 1250 is arranged to generate a repulsive force with the first door magnetic portion 50.

The guide unit 1200 includes a rack gear 1240 and the rack gear 1240 is configured to engage with the pinion gear of the converting unit 1300.

The driving unit 1400 includes a housing 1410 which defines the exterior of the driving unit 1400. The rack gear 1440 configured to engage with the pinion gear is provided in an outer surface of the housing 1410 such that the housing may be moved once the converting unit 1300 is rotated.

A first transmission member magnetic portion 1422 and a second transmission member magnetic portion 1424 are installed in the housing 1410. The first transmission member magnetic portion 1422 and the second transmission member magnetic portion 1424 are arranged to generate repulsive forces with the pillar magnetic portion 110. The first transmission member magnetic portion 1422 is arranged in a left area of the pillar magnetic portion 110 and the second transmission member magnetic portion 1424 is arranged in a right area of the pillar magnetic portion 110.

The first transmission member magnetic portion 1422 and the second transmission member magnetic portion 1424 are fixed to each other in the housing 1410. Even magnetic force interference will not change the locations.

Figure 7:
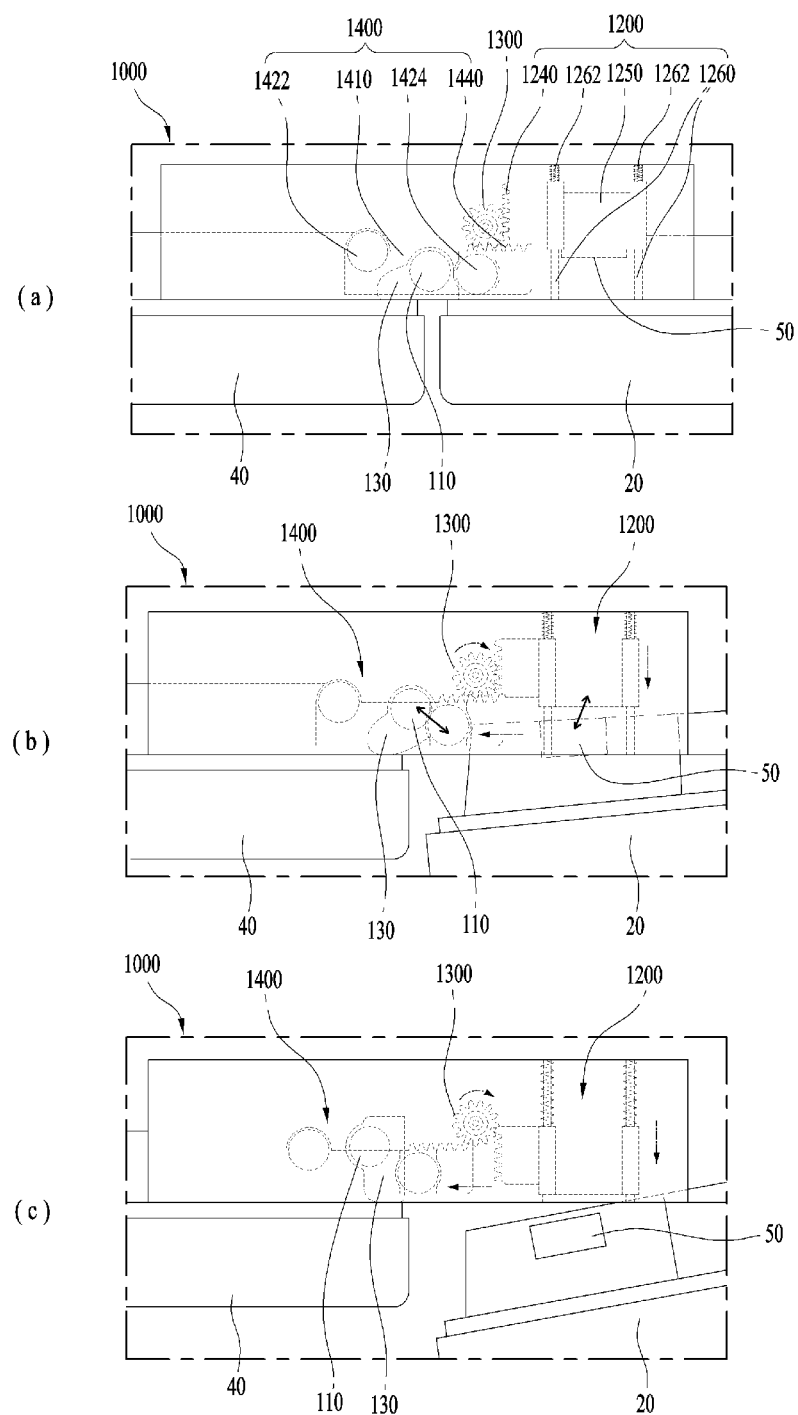
FIG. 7 a diagram illustrating the operation when a first door is rotated in the refrigerator in accordance with the second embodiment.
Figure 8:
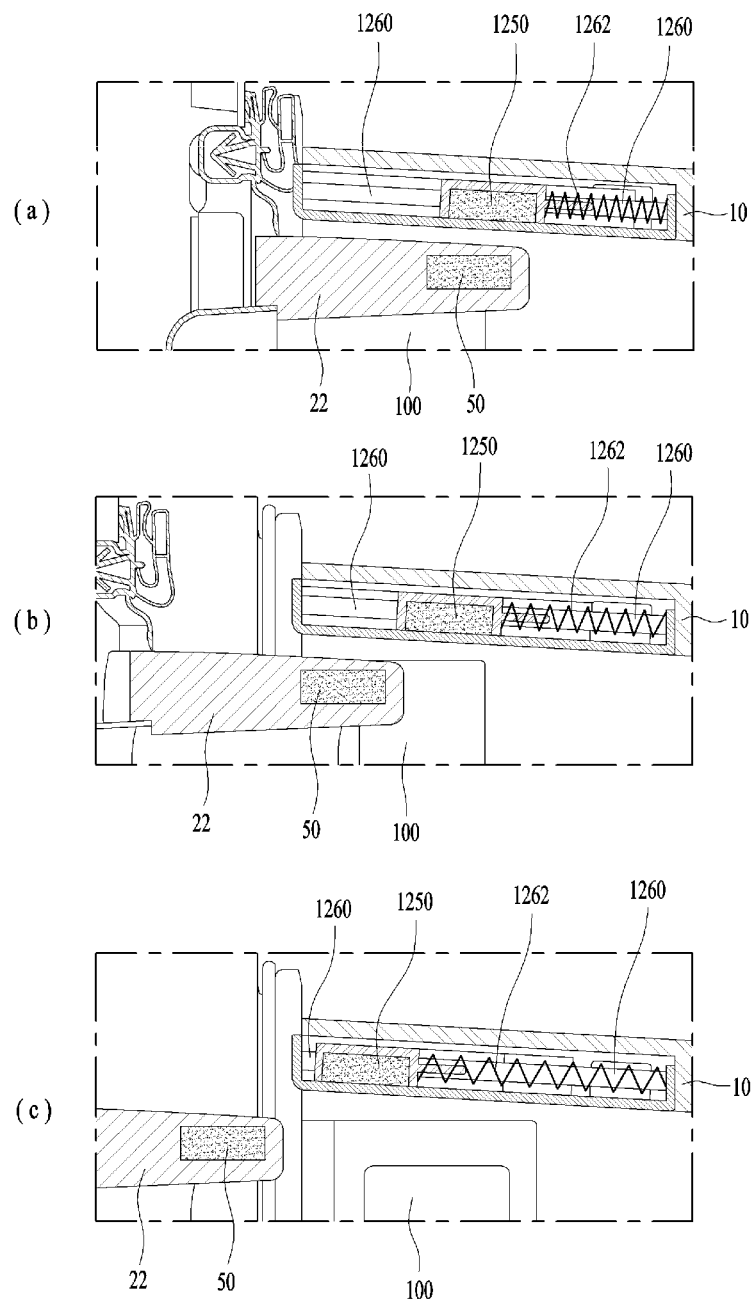
FIG. 8 is a side view of FIG. 7.

FIG. 7 a diagram illustrating the operation when a first door is rotated in the refrigerator in accordance with the second embodiment. FIG. 8 is a side view of FIG. 7.

FIGS. 7a, 7b and 7c illustrate the operation relation for opening the first door in a state where the user closes the second door. FIGS. 8a, 8b and 8c are diagrams of FIGS. 7a, 7b and 7c, viewed from a side.

Referring to FIGS. 7 and 8, when the user rotates the first door 20 in a state of closing the second door 40, the first door magnetic portion 50 becomes farther from the guide unit magnetic portion 1250 and the guide unit 1250 is forwardly moved by the restoring force of the elastic member 1262. Once the first door magnetic portion 50 becomes far from the guide unit magnetic portion 1250, the repulsive force becomes small and the external force applied to the elastic member 1262 becomes reduced.

When the guide unit 1200 is forwardly moved with respect to the view of FIG. 7, the converting unit 1300 is rotated in the clockwise direction and the driving unit 1400 is moved left. As the distance between the pillar magnetic portion 110 and the second transmission member magnetic portion 1424 becomes narrow, the repulsive force between the pillar magnetic portion 110 and second transmission member magnetic portion 1424 becomes large by the magnetic force. Accordingly, the pillar 100 is rotated in the counter-clockwise direction and the pillar 100 is folded.

The pillar 100 is folded in a state where the second door 40 is closed while the first door 20 is open. When approaching the storage chamber 2 to use the storage chamber 2, the user may not be disturbed by the pillar 100.

In contrast, the user is able to rotate the first door 20 to close the storage chamber 2 in a state where the second door 40 closes the storage chamber 2. The process is performed in the order shown in FIGS. 7c, 7b and 7a and the order shown in FIGS. 8c, 8b and 8a.

When the user rotates the second door to close the storage chamber 2 in a state where the first door 20 is completely open, the guide unit 1200 will not be moved backwardly as shown in FIGS. 7c and 8c before the first door magnetic portion 50 generates the magnetic force interference in the guide unit magnetic portion 1250 to compress the elastic member.

When the first door magnetic portion 50 becomes close to the guide unit magnetic portion 1250 by the sufficient rotation of the first door 20, the elastic member 1262 is compressed and the guide unit 1200 is then moved backwardly (with respect to the view of FIG. 7b) as shown in FIGS. 7b and 8b.

When the guide unit 1200 is moved backwardly, the converting unit 1300 is rotated in the counter-clockwise direction and the driving unit 1400 is moved left.

When the driving unit 1400 is moved left, the first transmission member magnetic portion 1422 and the second transmission member magnetic portion 1424 are moved left together.

When the first transmission member magnetic portion 1422, which is being moved left, is arranged close to the pillar magnetic portion 110, the repulsive force between the first transmission member magnetic portion 1422 and the pillar magnetic portion 110 becomes large by the magnetic force. Accordingly, the pillar 100 is rotated in the clockwise direction by the repulsive force and then unfolded as shown in FIG. 7a, so as to close the storage chamber 2 by contact with the first door 20 and the second door 40.

When the first door 20 is open, the transmission member 1000 guides the pillar 100 to be folded. When the first door 20 is closed, the transmission member 1000 guides the pillar 100 to be unfolded.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A refrigerator comprising:
a cabinet;
an inner case that is located inside of the cabinet and that defines a storage chamber;
a first door rotatably coupled to the cabinet and configured to open and close a first side of the storage chamber;
a second door rotatably coupled to the cabinet and configured to open and close a second side of the storage chamber, the second door comprising a pillar that is configured to rotate relative to the second door and that is configured to, based on rotation of pillar relative to the second door, contact the first door in a state in which the first and second doors are closed;
a transmission member that is located at the inner case, that is configured to detect rotation of the first door relative to the cabinet, and that is configured to guide rotation of the pillar relative to the second door based on detection of rotation of the first door relative to the cabinet;
a pillar magnetic portion located at an upper area of the pillar;
a transmission member magnetic portion located at the transmission member and configured to generate magnetic force that interferes with the pillar magnetic portion; and a first door magnetic portion located at an upper area of the first door and configured to operate the transmission member.

2. The refrigerator of claim 1, wherein the transmission member is configured to:
guide the pillar to rotate from an unfolded state to a folded state based on the first door being oriented in a position that opens the first side of the storage chamber; and
guide the pillar to rotate from the folded state to the unfolded state based on the first door being oriented in a position that closes the first side of the storage chamber.

3. The refrigerator of claim 1, wherein the transmission member comprises a driving unit that accommodates the transmission member magnetic portion, that is configured to guide rotation of the pillar, and that is configured to, based on rotation of the first door, move in a first lateral direction of the cabinet or a second lateral direction of the cabinet, and
wherein the second lateral direction is opposite to the first lateral direction.

4. The refrigerator of claim 3, wherein the transmission member further comprises:
a guide unit configured to, based on rotation of the first door relative to the cabinet, move in a forward direction of the cabinet or a backward direction of the cabinet; and
a converting unit configured to, based on the guide unit moving in the forward direction or the backward direction, cause the driving unit to move in the first lateral direction or the second lateral direction.

5. The refrigerator of claim 4, wherein the driving unit comprises a first rack gear, and the guide unit comprises a second rack gear, and
wherein the converting unit comprises a pinion gear configured to engage with at least one of the first rack gear or the second rack gear.

6. The refrigerator of claim 4, wherein the driving unit is configured to move in the second lateral direction based on the guide unit moving in the backward direction, and
wherein the driving unit is configured to move in the first lateral direction based on the guide unit moving in the forward direction.

7. The refrigerator of claim 4, wherein the guide unit comprises a first holder and a second holder that are configured to move downward toward the first door, and
wherein the first door defines a coupling groove in the upper area of the first door, the coupling groove being configured to receive the first holder and the second holder.

8. The refrigerator of claim 7, wherein the first holder includes a shaft located at a rear portion of the first holder, and
wherein the first holder is configured to rotate about the shaft to cause a front portion of the first holder to move downward toward the first door.

9. The refrigerator of claim 8, wherein the first holder further includes a tensile spring configured to cause the front portion of the first holder to move upward based on tensile force applied to the first holder by the tensile spring.

10. The refrigerator of claim 7, wherein the second holder includes a shaft located at a front portion of the second holder, and
wherein the second holder is configured to rotate about the shaft to cause a rear portion of the second holder to move downward toward the first door.

11. The refrigerator of claim 10, wherein the second holder further includes a tensile spring configured to cause the rear portion of the second holder to move upward based on tensile force applied to the second holder by the tensile spring.

12. The refrigerator of claim 7, wherein the driving unit includes a third holder that includes a shaft located at a first lateral portion of the third holder, and
wherein the third holder is configured to rotate about the shaft to cause a second lateral portion of the third holder to move downward toward the pillar.

13. The refrigerator of claim 12, wherein the third holder further includes a tensile spring configured to cause the second lateral portion of the third to move upward based on tensile force applied to the third holder by the tensile spring.

14. The refrigerator of claim 12, wherein the pillar comprises a pillar projection that protrudes upward from the upper area of the pillar and that is configured to, based on the third holder moving downward toward the pillar, couple to the third holder to guide rotation of the pillar.

15. The refrigerator of claim 4, wherein the transmission member magnetic portion comprises:
a first transmission member magnetic portion arranged in a first area of the pillar magnetic portion; and
a second transmission member magnetic portion arranged in a second area of the pillar magnetic portion.

16. The refrigerator of claim 15, wherein the first transmission member magnetic portion and the pillar magnetic portion are arranged to apply repulsive force to each other.

17. The refrigerator of claim 15, wherein the second transmission member magnetic portion and the pillar magnetic portion are arranged to apply repulsive force to each other.

18. The refrigerator of claim 15, wherein the guide unit comprises a guide unit magnetic portion that is arranged to apply repulsive force to the first door magnetic portion.

19. The refrigerator of claim 1, further comprising:
a first drawer located in the first side of the storage chamber and arranged closer to the first door than to the second door; and
a second drawer located in the second side of the storage chamber and arranged closer to the second door than to the first door,
wherein a width of the first drawer is equal to a width of the second drawer.

20. The refrigerator of claim 1, wherein a width of the first door is equal to a width of the second door.

* * * * *